(12) United States Patent
Schnell

(10) Patent No.: US 6,321,146 B1
(45) Date of Patent: Nov. 20, 2001

(54) DRIFT SENSOR FOR LAND VEHICLES

(75) Inventor: Jürgen Schnell, Denzlingen (DE)

(73) Assignee: LITEF GmbH (DE)

( * ) Notice: Subject to any disclaimer, the term of this patent is extended or adjusted under 35 U.S.C. 154(b) by 0 days.

(21) Appl. No.: 09/129,818

(22) Filed: Aug. 6, 1998

(30) Foreign Application Priority Data

Aug. 7, 1997 (DE) .............................................. 197 34 247

(51) Int. Cl.[7] .............................. G06F 7/00; G01C 22/00
(52) U.S. Cl. .................... 701/23; 701/26; 701/217; 318/587; 180/168
(58) Field of Search .................... 701/23, 24, 25, 701/26, 27, 28, 200, 207; 318/587, 576, 577, 580; 180/167, 168, 169

(56) References Cited

U.S. PATENT DOCUMENTS

| | | | |
|---|---|---|---|
| 4,310,789 | * | 1/1982 | Mank et al. ........................... 318/587 |
| 4,322,670 | * | 3/1982 | Taylor ................................. 318/587 |
| 4,711,316 | * | 12/1987 | Katou et al. .......................... 180/168 |
| 4,852,677 | * | 8/1989 | Okazaki ............................... 180/169 |
| 5,329,449 | * | 7/1994 | Tanizawa et al. ....................... 701/23 |
| 5,347,456 | * | 9/1994 | Zhang et al. .......................... 701/27 |
| 5,404,087 | * | 4/1995 | Sherman .............................. 318/587 |
| 5,434,781 | * | 7/1995 | Alofs et al. ........................... 701/23 |
| 5,916,285 | * | 6/1999 | Alofs et al. ........................... 701/23 |
| 5,925,080 | * | 7/1999 | Shimbara et al. ....................... 701/23 |

FOREIGN PATENT DOCUMENTS

| | | |
|---|---|---|
| 3910912 | 10/1890 | (DE) . |
| 4429016 | 2/1996 | (DE) . |
| 0769735 | 4/1997 | (EP) . |

\* cited by examiner

*Primary Examiner*—Jacques H. Louis-Jacques
(74) *Attorney, Agent, or Firm*—Elliott N. Kramsky

(57) ABSTRACT

A sensor is provided on the vehicle of a driverless transport system. The sensor is based on the principle of a computer mouse for ascertaining either a drift angle $\Delta\alpha$ or the transverse movement is detected as a path difference $\Delta q$ whereby lateral drift due, for example, to roadway covering irregularities and to curves, is detected directly. A considerable improvement in the tracking accuracy of driverless transport vehicles is thereby provided.

4 Claims, 3 Drawing Sheets

DRIFT SENSOR FOR LAND VEHICLES

BACKGROUND

1. Field of the Invention

The present invention relates to navigation equipped device-land vehicles, preferably driverless. More particularly, this invention pertains to a sensor fitted to such a vehicle that serves to detect lateral drive (i.e. movements transverse to the longitudinal axis of the vehicle) to permit a track correction when the vehicle deviates from a predefined path.

2. Description of the Prior Art

Driverless land vehicles, in particular transport vehicles or industrial trucks, are used to an increasing extent in warehouses, assembly halls and the like for path-specific transport and positionally accurate parts delivery. Such vehicles assume diverse designs. These are described, by way of example and preferably in conjunction with transport systems, in the following patent publications: EP-B1-0 391 206; U.S. Pat. Nos. 4,908,557; 4,772,832; EP-B1-0 278 853; DE-U1-87 01 762; DE-A-1 802 793; and DE-A1-36 06 418.

It is known to equip such driverless land vehicles with a navigation system, preferably one based on a fiber-optic gyroscope. To increase the tracking accuracy of such transport vehicles, particularly significant, for example, for positionally accurate charging of production lines, it is known, inter alia, from the above documents, to set track correction points, preferably in the form of permanent magnets, into the floor or the roadway covering, along a predefined route. At these correction points, the track predefined by the navigation device is checked and, if necessary, corrected and updated.

Although such transport systems operate satisfactorily in many applications, improvements in tracking accuracy are desirable. As a rule, the driving wheels of driverless transport vehicles are covered with hard natural rubber. The surface (i.e., the roadway covering) on which the transport vehicle moves is not always sufficiently even to prevent non-negligible transverse forces from arising. In addition, roadway coverings change during the course of use and/or as a result of the loading or transshipment of large masses, such as machines. Such transverse forces can then cause a lateral drift as the natural rubber covering of the wheels is not infinitely rigid. Furthermore, non-negligible transverse forces are produced when traveling through curves. Their effects have also been observed to be non-negligible during test runs. As a result of such transverse forces, it is not possible to carry out angle corrections using known navigation algorithms, shortly after traveling through a curve.

SUMMARY AND OBJECTS OF THE INVENTION

It is therefore an object of this invention to improve the navigation accuracy of driverless land vehicles by compensating for lateral drift.

The present invention addresses the preceding object by providing, in a first aspect, an improvement in a automatic guided land vehicle of the type that includes a navigation device for integrated navigation. The navigation device detects correction points fitted into a floor or roadway covering along a predetermined route to assist tracking and to maintain navigation accuracy.

The improvement provided by the invention resides in the land vehicle including a separate sensor that includes means including a trailing wheel for detecting the drift angle of and the path difference resulting from movements occurring transverse to the longitudinal axis of the vehicle.

In a second aspect, the invention provides a sensor. Such sensor is located on a vehicle equipped with a navigation device. The sensor includes means for detecting the drift angle of and the path difference resulting from movements transverse to the longitudinal axis of the vehicle.

The preceding and other features and advantages of the invention will be further apparent from the detailed description that follows. Such written description is accompanied by a set of drawing figures. Numerals of the drawing figures correspond to those of the written description, with like numerals referring to like features throughout.

DETAILED DESCRIPTION OF THE PREFERRED EMBODIMENT

Figure 1:
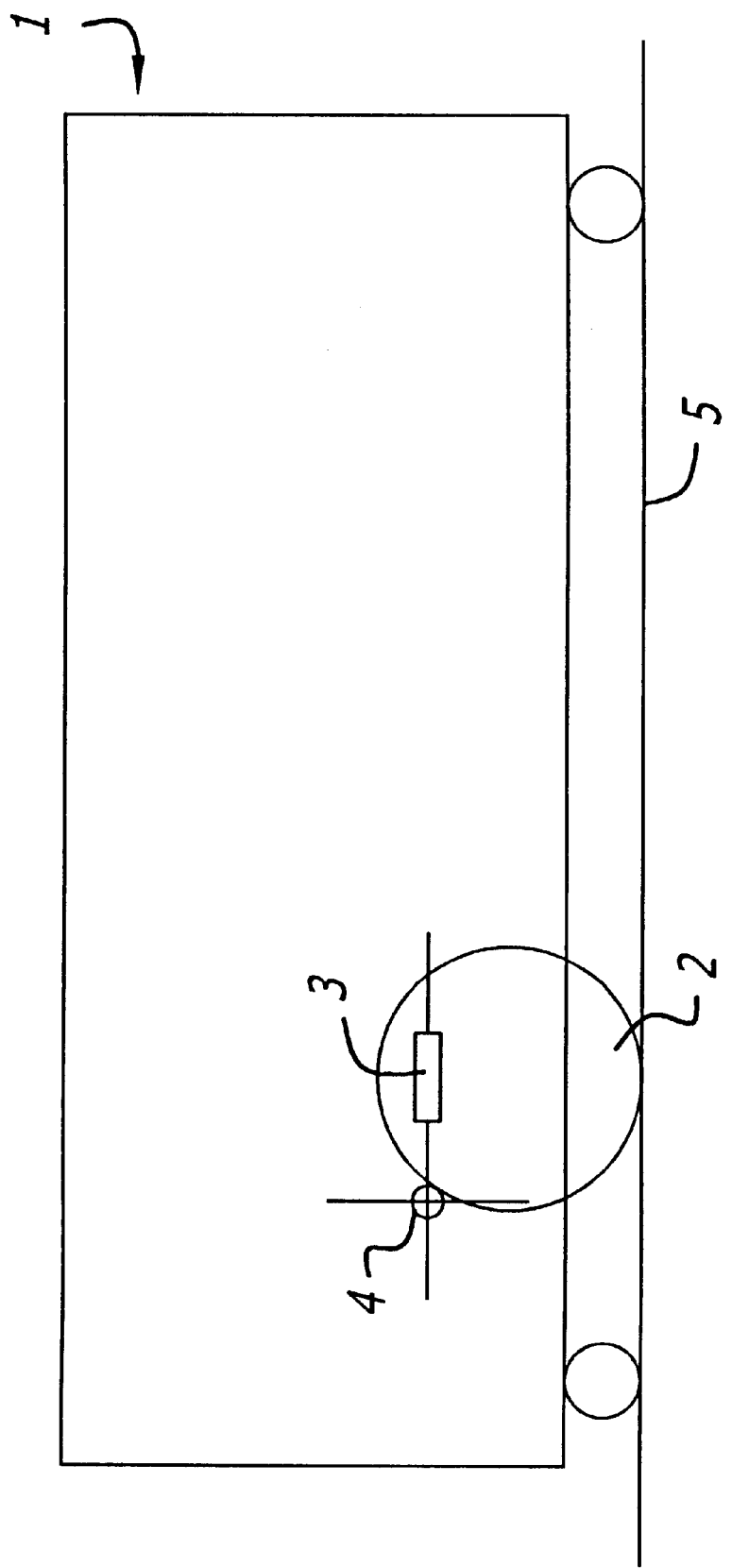
FIG. 1 illustrates a transport vehicle equipped with a transverse-drive sensor in the form of a computer mouse in accordance with the invention.

FIG. 1 illustrates a driverless transport vehicle 1, which is moved along a roadway 5 in accordance with a predefined track program. To detect transverse drift movements of the vehicle 1, a transverse-drive sensor 2 is located on the underside of the vehicle 1. The sensor 2, designed as an (enlarged) computer mouse, has a first friction roller 3 aligned, preferably, along the longitudinal axis of the vehicle with a second friction roller 4 mounted perpendicular to the first friction roller 3. The friction rollers 3, 4 may also comprise friction balls.

Figure 2:
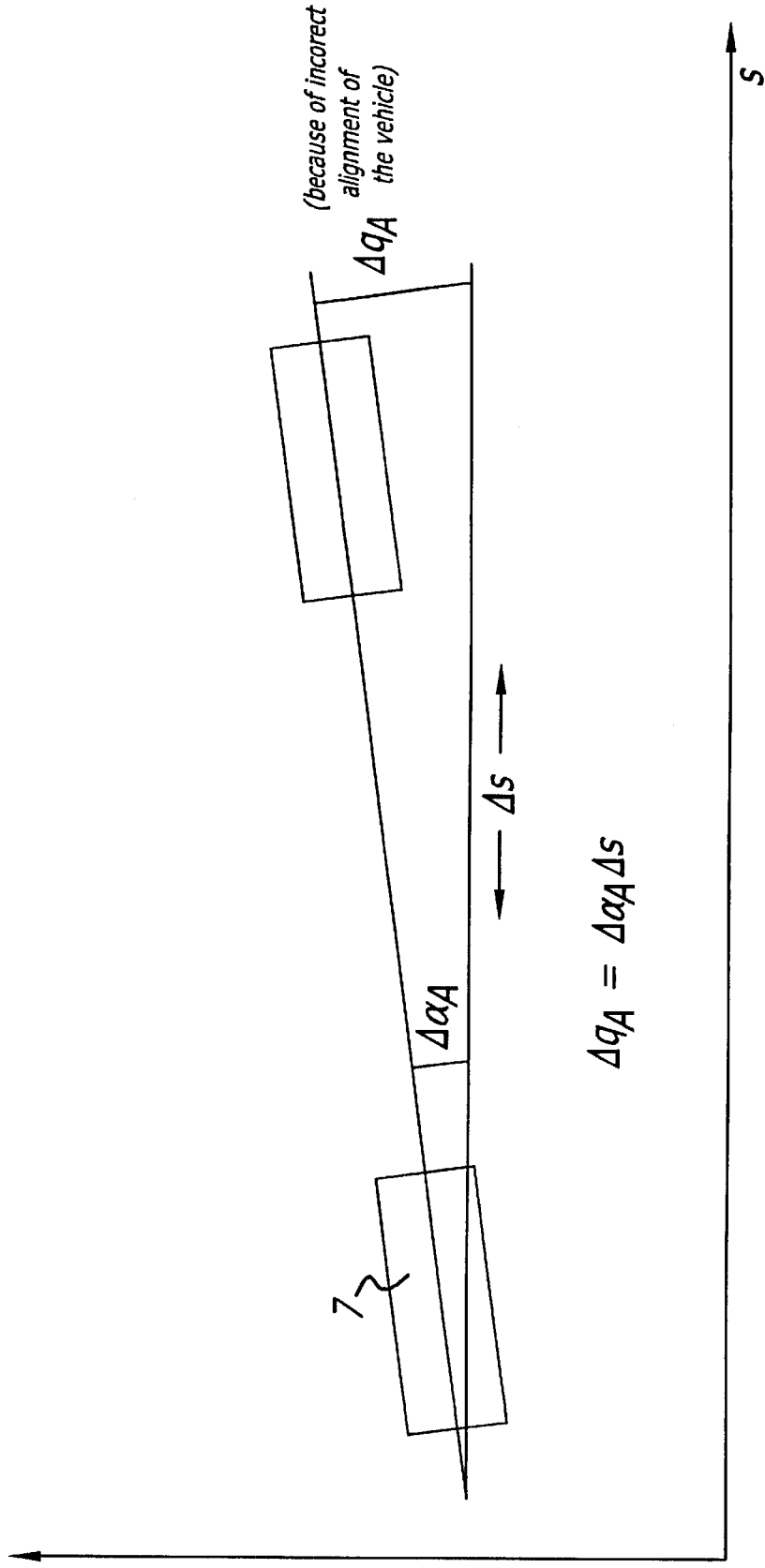
FIGS. 2 and 3 are diagrams for use in explaining the functioning of the invention which take into account the geometry of a vehicle equipped with a navigation system including a transverse-drift sensor in accordance with the invention.
Figure 3:
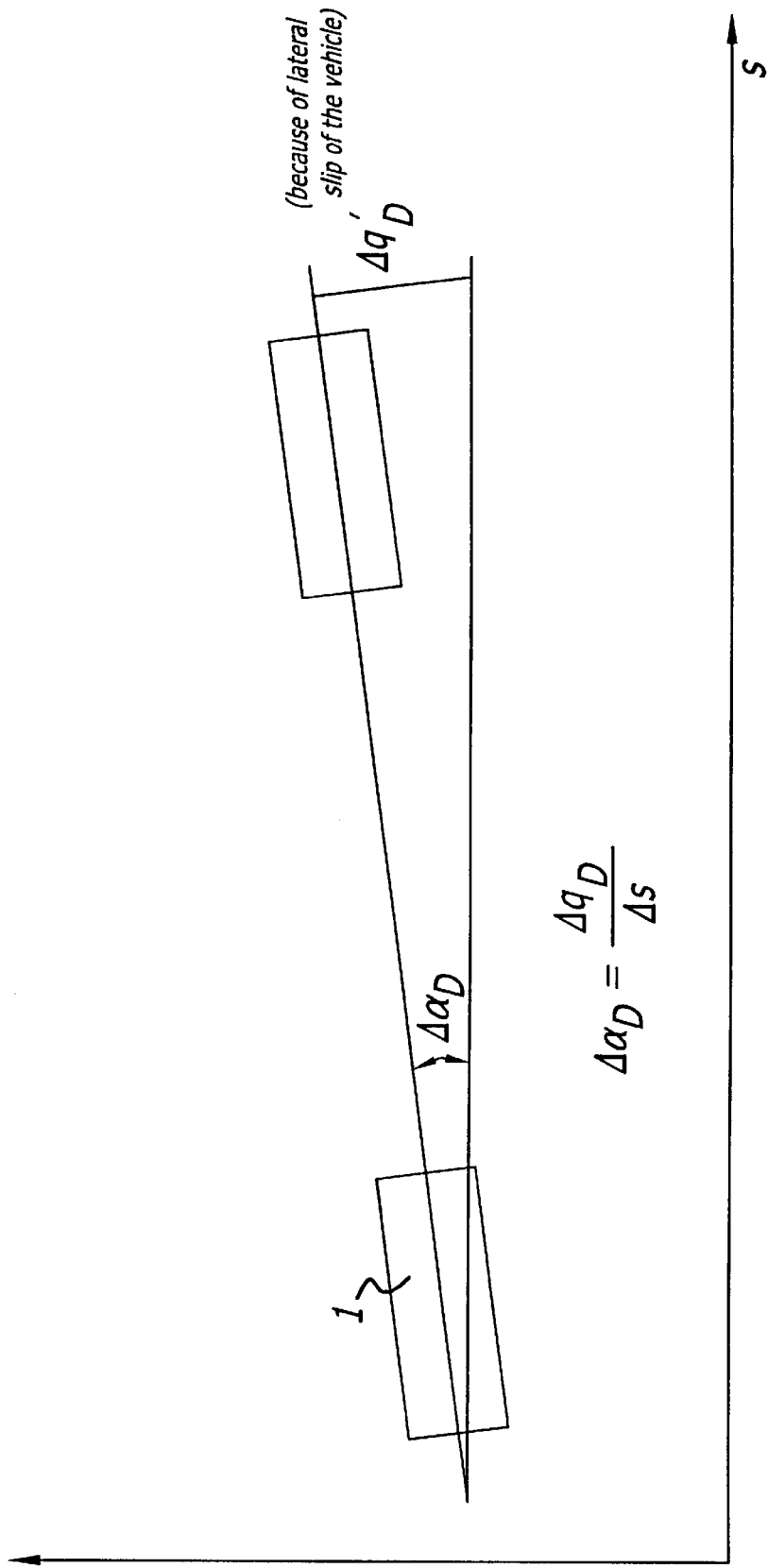

FIG. 2 is a graph for illustrating how a transverse offset $\Delta q_A$ results from incorrect alignment $\Delta \alpha_A$ of the vehicle 1. In contrast, FIG. 3 illustrates how a transverse offset $\Delta q_D$ may result from transverse drift (lateral slip) without alignment errors. The transverse offset $\Delta q_D$ corresponds to an apparent drift angle alignment error $\Delta \alpha_D$. In order to correct the alignment as well as the position of the vehicle, it is therefore necessary to split the overall transverse offset $\Delta q$ of the vehicle into its two causes or causal components.

It is therefore necessary to distinguish between two cases:

1. With a measurement of the drive angle $\Delta \alpha_D$, the actual alignment error $\Delta \alpha_A$ is given by the overall error angle $\Delta \alpha = \Delta q / \Delta s$ minus the drive angle $\Delta \alpha_D$, that is to say $$\Delta \alpha_A = \Delta \alpha - \Delta \alpha_D.$$

2. With a measurement of the drift offset $\Delta q_D$, the alignment error $\Delta q_A$ is calculated from the transverse offset $\Delta q_D$ and the overall transverse offset $\Delta q$ $$\Delta q_A = \frac{\Delta q - \Delta q_D}{\Delta s}$$

The navigation program can then correct its alignment by the actual alignment error $66\alpha_A$, and correct its position by $\Delta q$ (overall correction).

The two errors, which are superimposed, can only be corrected as a whole using prior-art measurement techniques. The invention allows the vehicle to arrive at the next point more accurately, so that either the interval between the correction points can be increased or the vehicle easily remains on an accurate track.

In an extension of the idea of the invention, the wheel sensors that are usual in transport vehicles of the type under discussion could be replaced by two mouse sensors.

Instead of the mouse sensor, a trailing wheel can also be used for measuring the drift angle.

In principle, the navigation accuracy might also be improved by taking lateral drift into account, by, for example, making the interval between the correction points (updating points) sufficiently small in comparison to the period of irregularities in the floor (ascertained empirically). Such an approach would naturally make the costs of surveying and installing such a transport system considerably greater.

The invention takes another path, proposing to detect the transverse movements resulting from transverse forces directly using a measuring arrangement installed on the vehicle. With the aid of a computer-type mouse, which detects transverse movements of the vehicle, it is possible, via a computer program assigned to the navigation system, to either detect the drift angle of the transverse movement directly or to detect the lateral path difference and employ it for track correction.

By comparison to the possible solutions using a reduced and variable distribution and arrangement of the correction points, the invention offers the considerable advantage that it is also possible, following the installation of the driverless transport system, to compensate readily for roadway irregularities and for the resultant transverse forces occurring, for example, as a result of temperature fluctuations, warping, contamination and the like. In the case of installation of a driverless transport system, for example an assembly hall, it is no longer necessary to pay precise attention to the possible period of roadway irregularities while distributing the correction, updating or reference points (magnets). Such correction points can be laid in accordance with a predefined pattern that is observed to a greater or lesser extent, if appropriate even variably, for example at intervals of 5 m to 40 m or at even greater intervals.

As a result of the inclusion in the navigation program of the lateral drift that is detected directly by means of the transverse-movement sensor, the navigation accuracy of driverless land vehicles, in particular material transport vehicles, is considerably improved.

While the present invention has been disclosed with reference to its presently-preferred embodiment, it is not limited thereto. Rather, this invention is limited only insofar as it is defined by the following set of patent claims and includes within its scope all equivalents thereof.

What is claimed is:

1. In an automatic guided land vehicle of the type that includes a navigation device for integrated navigation for detecting remotely-spaced sequential correction points fitted into a floor or roadway covering defining a predetermined route to assist tracking and maintain navigation accuracy by the use of a navigation algorithm, the improvement comprising, in combination:

a) said land vehicle including a sensor for generating a signal independent of said navigation device; and b) said sensor including means comprising a trailing wheel for detecting the drift angle and path difference resulting from movements occurring transverse to the longitudinal axis of said vehicle; and c) said navigation algorithm being arranged to provide a course correction based, in part, upon the output of said sensor.

2. A driverless land vehicle as defined in claim 1 wherein said means further includes:

a) a first friction roller; and b) a second friction roller, said roller being arranged in accordance with the principle of the computer mouse.

3. A driverless land vehicle as defined in claim 1 wherein said means further includes:

a) a first friction ball; and b) a second friction ball, said ball being arranged in accordance with the principle of the computer mouse.

4. An automatic guided land vehicle as defined in claim 1 wherein said navigation algorithm derives vehicle alignment error corrected for measured movements transverse to the longitudinal axis of said vehicle.

* * * * *